Figure 4:
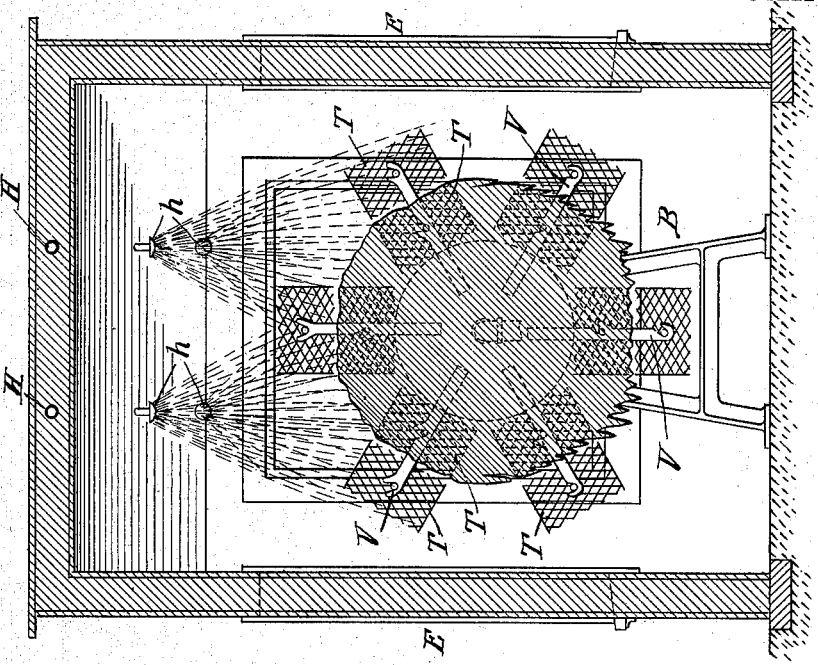

No. 738,762. PATENTED SEPT. 15, 1903.
W. G. BLOSS.
APPARATUS FOR COOLING AIR.
APPLICATION FILED JUNE 3, 1903.
NO MODEL. 3 SHEETS—SHEET 1.
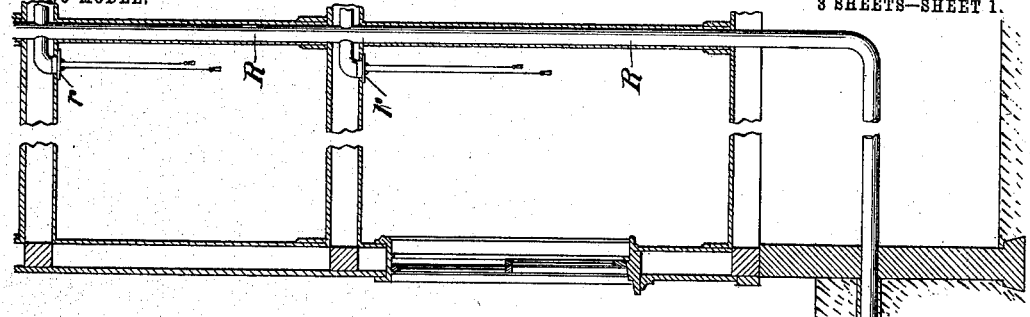
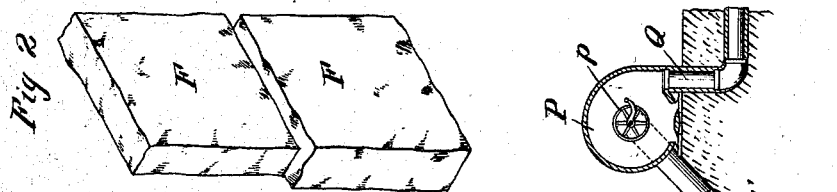
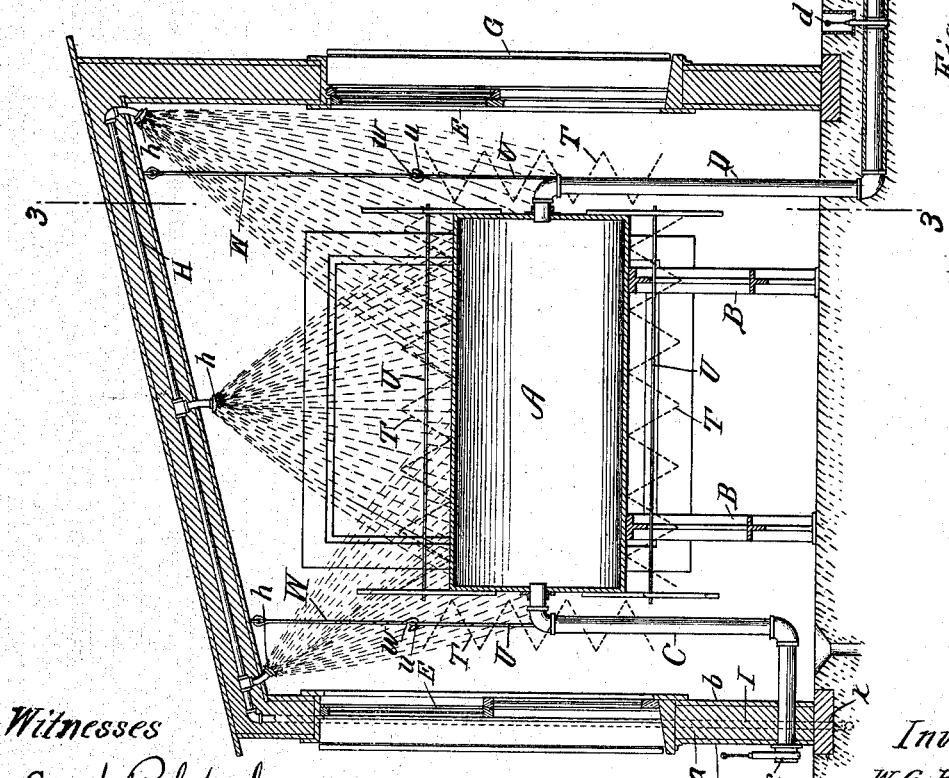
Witnesses
Ernest Pulsford.
A. M. Parkins.
Inventor
W. G. Bloss
By Baldwin Davidson Wight.
his Attorneys.

No. 738,762. PATENTED SEPT. 15, 1903.
W. G. BLOSS.
APPARATUS FOR COOLING AIR.
APPLICATION FILED JUNE 3, 1903.
NO MODEL. 3 SHEETS—SHEET 2.

Witnesses.
Ernest Pulsford.
A. M. Parkins.

Inventor
W. G. Bloss.
By Baldwin Davidson Wight
his Attorneys

No. 738,762. PATENTED SEPT. 15, 1903.
W. G. BLOSS.
APPARATUS FOR COOLING AIR.
APPLICATION FILED JUNE 3, 1903.
NO MODEL. 3 SHEETS—SHEET 3.
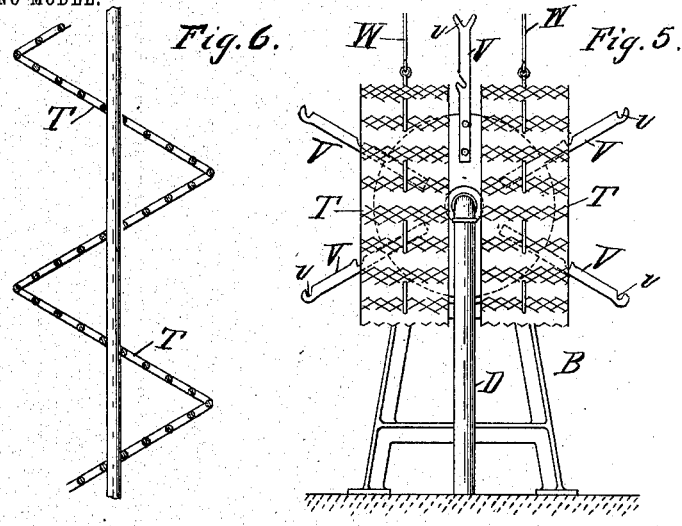
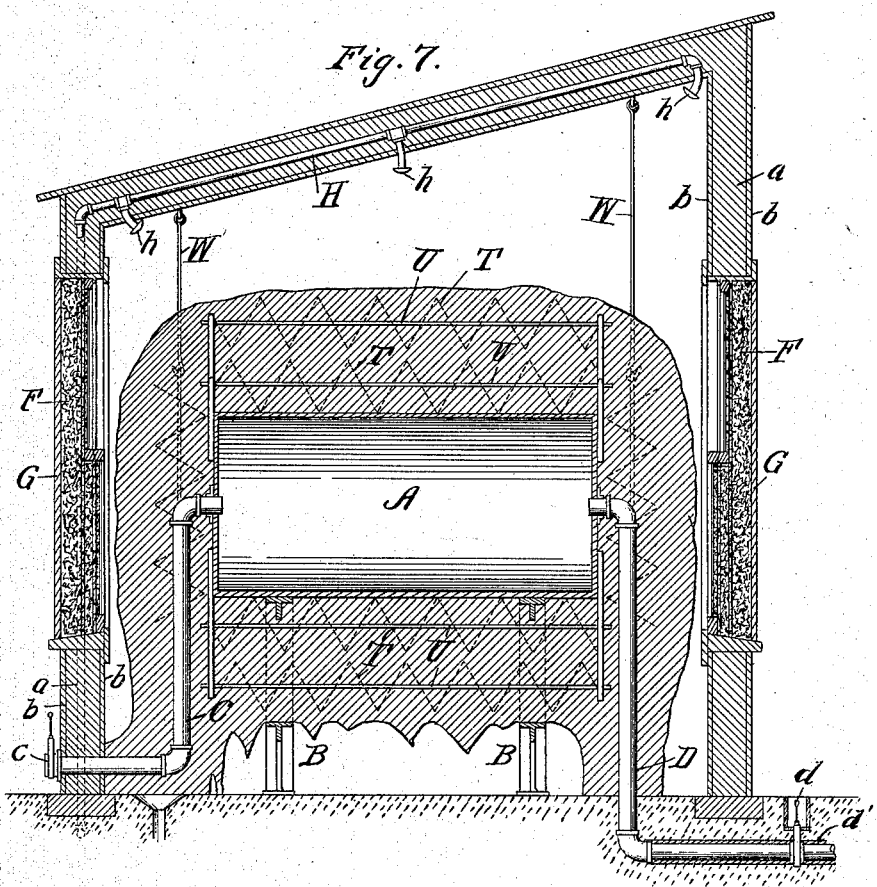
Witnesses
Ernest Pulsford
A. M. Parkins
Inventor
W. G. Bloss.
By Baldwin Davidson & Wight
his Attorneys.

No. 738,762. Patented September 15, 1903.

UNITED STATES PATENT OFFICE.

WILLIAM G. BLOSS, OF PONTIAC, ILLINOIS.

APPARATUS FOR COOLING AIR.

SPECIFICATION forming part of Letters Patent No. 738,762, dated September 15, 1903.

Application filed June 3, 1903. Serial No. 159,923. (No model.)

*To all whom it may concern:*

Be it known that I, WILLIAM G. BLOSS, a citizen of the United States, residing at Pontiac, in the county of Livingston and State of Illinois, have invented certain new and useful Improvements in Air-Cooling Apparatus, of which the following is a specification.

The object of my invention is to provide improved apparatus for cooling air by means of ice formed in freezing weather by natural cold and preserved in a housing of non-conducting material.

In my application for patent, Serial No. 140,944, filed January 28, 1903, I have shown an apparatus in which an air-chamber is elevated on standards and inclosed by a housing of such dimensions as to afford a large space around the air-chamber for the formation of ice, said housing being so constructed as to permit the free access of cold air around the air-chamber and when desired to inclose the chamber with non-conducting material, so as to insulate the ice from the action of heat when the temperature of the outside air rises. Water is conveyed to the freezing-house by means of a pipe provided with sprinklers arranged above the air-chamber, which cause the water to be delivered around and upon the chamber in the form of spray or fog, which gradually freezes, the air-chamber ultimately being completely surrounded by a solid mass of ice, which cools the air in the chamber and maintains it at a low temperature as long as the ice is prevented from melting, which may be for a very long time, owing to its great size and to the housing by which it is surrounded. Suitable means are provided for conveying air to and withdrawing it from the chamber and distributing it where needed.

I have found that ice may be better formed around the air-chamber at a temperature slightly below the freezing-point when some means is provided for receiving the sprayed water and holding it in a finely-divided condition in a space around the chamber to which the cold air has free access. For this purpose I surround the air-chamber with frames of reticulated material, such as coarse wire-gauze or poultry-netting, and cause the water to be sprayed upon these frames. At first ice forms on the air-chamber and on the wires composing the frames, then water is sprayed upon the ice-covered air-chamber and ice-covered wires, and then more ice is formed, until finally the frames are fully covered with a solid mass of ice. If desired, additional frames may be placed in position around the mass of ice first formed and more ice may be formed on these frames.

Figure 3:
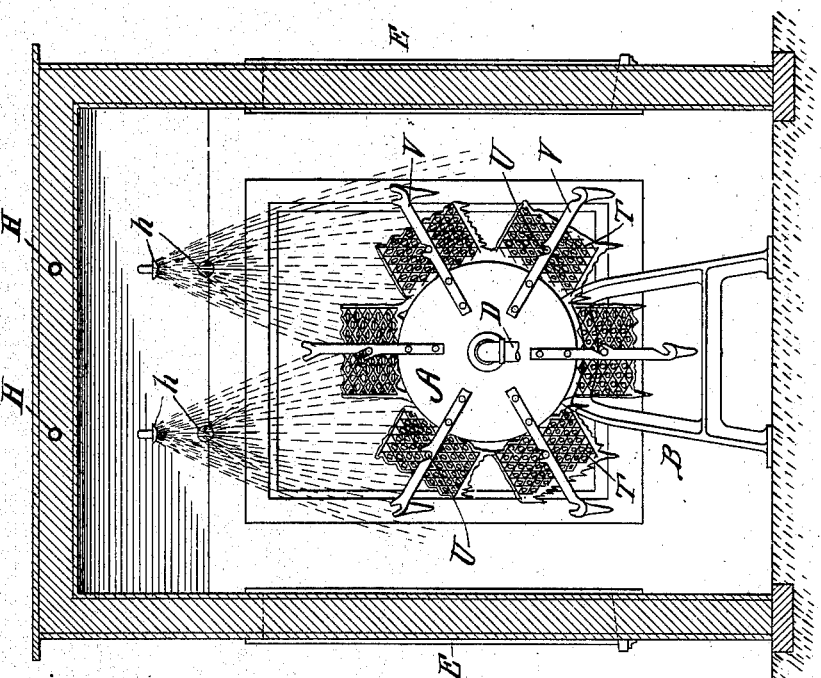

In the accompanying drawings, illustrating my invention, Figure 1 is a diagram showing a vertical central section through my improved apparatus for cooling air connected with a house provided with a pipe system for distributing cold air. Fig. 2 is a view showing in perspective packing-pads which may be used for closing the windows. Fig. 3 shows a vertical section of the air-cooling apparatus on the line 3 3 of Fig. 1, with the windows closed and packed and the ice just beginning to form. Fig. 4 is a view similar to Fig. 3, with a mass of ice formed on the first frames around the air-chamber and showing also additional frames around which more ice is subsequently formed. Fig. 5 is a detail view, in end elevation, showing the manner in which vertical frames are arranged at the ends of the air-chamber. Fig. 6 is a detail view, on an enlarged scale, showing the manner in which the frames are constructed. Fig. 7 is a view of the air-cooling apparatus similar to that shown in Fig. 1, but with the air-chamber completely surrounded by a mass of ice formed on two sets of frames.

The air-chamber A may be made of any suitable shape and size and of any suitable material. It is preferably a metallic cylinder of large dimensions supported by standards B and provided with an inlet-pipe C and an air-discharge pipe D. The air-chamber should be located in some suitable place where it may be exposed to the lowest natural temperature obtainable, and it is inclosed by a housing which when closed up will protect the inside from a high temperature on the outside, but which may be readily opened up to admit cold air to the interior of the house when it is desired to form ice around the air-chamber. As shown, the walls and roof of the house are made quite thick, non-conducting material $a$—such as straw, sawdust, &c.—being interposed between boards or the like, b. Large windows E are provided that may be opened by raising the sashes, as shown in Fig. 1. When the windows are closed, pads F, of felt, sawdust, or straw inclosed in cloth, may be placed in the window-openings and held in place by shutters G, in the manner indicated in Fig. 7.

In the roof above the air-chamber A is arranged a water-pipe H, having branches provided with roses or sprinklers h. The pipe H is inclosed in the non-conducting material of the roof and connects with the supply-pipe I, also inclosed in the non-conducting material of the housing and entering the ground at x. In this way I prevent the water in the pipe from freezing when it is not running. Of course when the water is running there is no tendency for the pipes to freeze. Any suitable means may be provided for regulating the flow of water through the pipes I and H, such as a valve or cock on the outside of the building. The sprayers or sprinklers are preferably arranged to deliver water in the manner indicated in Fig. 1.

It will be understood, of course, that the windows are so arranged as to permit air to freely enter the inclosure, so that the temperature of the air inside the housing will be practically the same as that on the outside. It will also be understood that an attendant may be at hand to regulate the supply of water while the freezing operation is progressing. If the water is fed too fast, it may be turned off until the ice has sufficiently formed around the air-chamber to allow of the addition of more water to form more ice. At any rate, the supply of water may be properly regulated so that finally a large solid mass of ice may be formed around the air-chamber. When this is done, the windows should be closed, the pads placed in position, and the shutters closed against the pads, as indicated in Fig. 7.

The air-inlet pipe C is provided outside the building with valve c, and the air-outlet pipe D is provided outside the building with a valve d. The pipe D may be carried underground to such a depth that no covering may be required to keep down the temperature of the pipes; but if the air-discharge pipe is arranged close to the surface a cover of some non-conducting material d' may be used. The pipe D connects with a pump P, which may be a rotary pump of ordinary construction operated by power applied to a pulley p, or the pump may be worked by hand.

Q indicates the pipe leading from the pump and connecting with pipes in a building through which cold air is discharged into the rooms or compartments. The pipes R may be arranged in any suitable way in the building, the discharge-openings r preferably being arranged at the top of the rooms or compartments, so that the cold air may be allowed to fall gradually into the compartments or rooms, and thus reduce the temperature without producing a draft. The warm air may be reduced in temperature in this way or may be displaced, the warm air passing out through the windows or through the cracks around the windows.

So far as already described the apparatus is similar to that shown in my application above mentioned. I have found that such apparatus may be improved by employing frames around the air-chamber, which receive the sprayed water and hold it in the space surrounding the air-chamber while it is being frozen. Where the water is received directly upon the air-chamber, the surface exposed to the cooling effects of the atmosphere is somewhat limited; but by providing open frames around the air-chamber such surface is very materially increased.

In carrying out my present invention I preferably surround the air-chamber with a series of frames T, made of reticulated material, such as wire-cloth, and preferably of that kind of wire-cloth known as "poultry-netting." Each frame is preferably constructed from a long strip of such netting—say two and one-half feet wide—bent into zigzag form and strung on a rod U. The opposite ends of the rods are supported by arms V, attached to the ends of the air-chamber. When the netting is bent in the manner indicated and strung on the rods, it is held in shape, being prevented from either folding or collapsing. As indicated, the rods are arranged in notches or sockets v, formed in the arms V, from which they may be readily removed whenever desired. At the ends of the air-chambers similar strips of netting T are arranged; but in this case they are disposed vertically, the rods U being formed at their upper ends with eyes u, detachably connected with rods W, depending from the top of the housing and provided with hooks w, engaging the eyes u. In Fig. 1 I have shown the air-chamber surrounded by a single set of frames. When the temperature is below the freezing-point or sufficiently low and the windows of the housing are open, air may be admitted to the housing and the water turned on. The air-chamber and the frames will be covered with a thin layer of water, which will immediately freeze, and then as more water is received on the ice-covered air-chamber and frames an additional layer of ice will be formed, until finally the air-chamber is completely surrounded with ice, in the manner indicated in Fig. 4. If desired, the size of the mass of ice surrounding the air-chamber may be increased by placing more frames upon the supports or arms V, in the manner indicated in Fig. 4. Ice will be formed upon the mass of ice indicated in Fig. 4 and also on and around the outside frames shown in Fig. 4, until finally the air-chamber will be surrounded by a large mass of ice covering both sets of frames, in the manner indicated in Fig. 7.

It is obvious that many modifications may be made in the manner of carrying out my invention. While I prefer to employ poultry-netting to form the frames, other material may be employed.

The cold air may, according to my invention, be conveyed and distributed in various ways. I have found it to be entirely practicable to surround an air-chamber with a large mass of ice during zero or freezing weather in the winter and to preserve this ice around the air-chamber until and during the summer months and to be able to draw cold air from the air-chamber whenever required. Of course when the air is pumped out of the air-chamber a vacuum will be produced; but I have provided a pipe C, by means of which the air-chamber may be filled with enough air to fill the chamber and to be thereafter reduced in temperature. I preferably do not draw the air continuously through the air-chamber, but fill such chamber from time to time, allowing the air to remain in the chamber long enough to have its temperature sufficiently reduced to be conveyed a suitable distance and to be distributed with cooling effect wherever needed. Of course the air-chamber and the other parts of the apparatus may be made of very large capacity, sufficient to supply all demands.

I claim as my invention—

1. An apparatus for cooling air by means of ice formed by the natural temperature in zero or freezing weather, comprising an air-chamber, open-work or reticulated frames surrounding said chamber, a housing of non-conducting material provided with openings to allow cold air to freely enter and surround the air-chamber and its frames, means for spraying water within the housing upon the air-chamber and frames while the latter are exposed to the outside temperature, means for closing the openings in the housing with non-conducting material after a mass of ice is formed around the air-chamber, and pipes for admitting air to and conveying it from the air-chamber.

2. The combination of an air-chamber, standards supporting it at an elevation, frames of open-work or reticulated material surrounding the air-chamber, a housing of non-conducting material surrounding the air-chamber and frames, water-pipes arranged in the non-conducting material of the housing, sprinklers branching from the water-pipes for spraying water upon the air-chamber and frames, and pipes for conveying air to and carrying it from the air-chamber.

3. An apparatus for cooling air by means of ice formed by the natural temperature in zero or freezing weather, comprising an air-chamber, frames of open-work or reticulated material surrounding the air-chamber, a housing of non-conducting material surrounding the air-chamber and frames, and provided with openings to allow cold air to freely enter, means for spraying water within the housing upon the air-chamber and frames while the latter are exposed to the outside temperature, and means for closing the openings with non-conducting material after a mass of ice has been formed.

4. The combination of an air-chamber, means for admitting air to and withdrawing it from the chamber, a non-conducting housing for the chamber, and frames for surrounding the air-chamber each comprising a length of wire-netting bent into zigzag form and strung on a rod.

In testimony whereof I have hereunto subscribed my name.

WILLIAM G. BLOSS.

Witnesses:
ADAM H. LONG,
W. CRAWFORD.